United States Patent
Matthias et al.

(10) Patent No.: US 11,313,257 B2
(45) Date of Patent: Apr. 26, 2022

(54) CAVITY VALVE WITH OPTIMIZED SHAFT INTERIOR GEOMETRY, AND METHOD FOR PRODUCING SAME

(71) Applicant: FEDERAL-MOGUL VALVETRAIN GMBH, Barsinghausen (DE)

(72) Inventors: Thorsten Matthias, Hannover (DE); Antonius Wolking, Barsinghausen (DE); Andreas Heinek, Bannewitz (DE); Guido Bayard, Dortmund (DE)

(73) Assignee: Federal-Mogul Valvetrain GmbH, Barsinghausen (DE)

( * ) Notice: Subject to any disclaimer, the term of this patent is extended or adjusted under 35 U.S.C. 154(b) by 113 days.

(21) Appl. No.: 16/624,996

(22) PCT Filed: Mar. 1, 2018

(86) PCT No.: PCT/EP2018/055048
§ 371 (c)(1),
(2) Date: Dec. 20, 2019

(87) PCT Pub. No.: WO2019/001780
PCT Pub. Date: Jan. 3, 2019

(65) Prior Publication Data
US 2020/0173318 A1 Jun. 4, 2020

(30) Foreign Application Priority Data
Jun. 29, 2017 (DE) .......................... 102017114509.5

(51) Int. Cl.
*F16K 27/00* (2006.01)
*F01L 3/14* (2006.01)
(Continued)

(52) U.S. Cl.
CPC ............... *F01L 3/14* (2013.01); *B23P 15/001* (2013.01); *F16K 49/007* (2013.01); *F01L 2303/00* (2020.05)

(58) Field of Classification Search
CPC ........ B23P 15/001; F16K 49/007; F01L 3/14; F01L 3/20; F01L 2301/00; F01L 2303/00; F01L 3/06; F01L 3/04; F02F 1/24
(Continued)

(56) References Cited

U.S. PATENT DOCUMENTS 2,131,953 A * 10/1938 Jardine ..................... F01L 3/02
29/888.451
2,144,147 A * 1/1939 Glassford ................. F01L 1/14
29/888.43
(Continued)

FOREIGN PATENT DOCUMENTS

CN 202900355 U 4/2013
CN 205154285 U 4/2016
(Continued)

*Primary Examiner* — Hung Q Nguyen
*Assistant Examiner* — Anthony Donald Taylor, Jr.
(74) *Attorney, Agent, or Firm* — Robert L. Stearns; Dickinson Wright, PLLC

(57) ABSTRACT

A hollow valve having optimized interior stem geometry, whose valve stem has surface-enlarging structuring on an inner surface is provided. Also provided is a method for manufacturing a valve body of such a hollow valve, wherein the method comprises: providing a bowl-shaped semi-finished product having an annular wall that surrounds a cavity, and having a base section, followed by lengthening the wall with an inserted, structured mandrel, and lastly, reducing an outer diameter of the annular wall without a mandrel to obtain a predetermined valve stem outer diameter of a valve to be manufactured.

9 Claims, 2 Drawing Sheets

(51) Int. Cl.
*B23P 15/00* (2006.01)
*F16K 49/00* (2006.01)

(58) Field of Classification Search
USPC .......................... 123/41.41, 188.3; 251/366
See application file for complete search history.

(56) References Cited

U.S. PATENT DOCUMENTS

| | | | | | |
|---|---|---|---|---|---|
| 2,411,734 | A | * | 11/1946 | Kerwin | B21K 1/22 123/188.1 |
| 2,411,764 | A | * | 11/1946 | Thoren | B21K 21/16 29/888.45 |
| 2,452,636 | A | * | 11/1948 | Cunningham | F01L 3/12 29/888.452 |
| 2,627,259 | A | * | 2/1953 | Wood | F01L 3/04 123/188.3 |
| 2,731,708 | A | * | 1/1956 | Kubera | B21C 1/18 29/888.451 |
| 2,893,553 | A | * | 7/1959 | Kreidler | B21C 23/14 72/256 |
| 3,016,601 | A | * | 1/1962 | Cherrie | F01L 3/14 29/888.452 |
| 5,054,195 | A | * | 10/1991 | Keck | B21K 1/22 29/888.453 |
| 5,056,219 | A | * | 10/1991 | Iwase | B21K 1/22 29/888.451 |
| 5,458,314 | A | * | 10/1995 | Bonesteel | B21D 22/21 251/337 |
| 5,619,796 | A | * | 4/1997 | Larson | B21D 22/21 29/888.45 |
| 5,738,060 | A | * | 4/1998 | Colo | F01L 3/02 123/188.11 |
| 5,823,158 | A | * | 10/1998 | Heimann, Jr. | F01L 3/02 123/188.3 |
| 6,006,713 | A | * | 12/1999 | Gebauer | F01L 3/12 123/188.3 |
| 7,240,895 | B2 | * | 7/2007 | Abele | F01L 3/20 251/356 |
| 8,650,752 | B2 | * | 2/2014 | Yoshimura | F01L 3/14 29/888.092 |
| 8,881,391 | B2 | * | 11/2014 | Morii | B21C 23/183 29/888.45 |
| 9,255,559 | B2 | * | 2/2016 | Kroos | B60G 21/0555 |
| 10,279,440 | B2 | * | 5/2019 | Liu | B21H 1/18 |
| 2008/0034573 | A1 | * | 2/2008 | Ohnuma | B21K 1/20 29/558 |
| 2011/0174259 | A1 | * | 7/2011 | Yoshimura | B23P 15/002 123/188.2 |
| 2014/0033533 | A1 | * | 2/2014 | Morii | B21K 1/22 29/890.12 |
| 2014/0366373 | A1 | * | 12/2014 | Morii | B23P 15/002 29/888.451 |

FOREIGN PATENT DOCUMENTS

| | | | |
|---|---|---|---|
| DE | 10118032 A1 | 10/2002 | |
| DE | 10057192 B4 | 12/2009 | |
| EP | 2 690 262 A1 | 1/2014 | |
| GB | 594562 A * | 11/1947 | ............... F01L 3/02 |
| JP | S63 171605 U | 11/1988 | |
| JP | H03 52309 U | 5/1991 | |
| JP | 2009 138594 A | 6/2009 | |
| JP | 2011 179390 A | 9/2011 | |
| JP | 2014084725 A * | 5/2014 | ............... F01L 3/14 |
| JP | 2014084725 A | 5/2014 | |
| JP | 2014 166644 A | 9/2014 | |

\* cited by examiner

CAVITY VALVE WITH OPTIMIZED SHAFT INTERIOR GEOMETRY, AND METHOD FOR PRODUCING SAME

BACKGROUND

1. Technical Field

The present invention relates to a method for manufacturing hollow valves for internal combustion engines, and hollow valves manufactured using the method. In particular, the present invention relates to hollow valves having optimized interior stem geometry, resulting in improved internal cooling.

2. Related Art

Intake valves and exhaust valves are components in internal combustion engines that are subject to high thermal and mechanical stress. Therefore, sufficient cooling is necessary to ensure long-term functionality of the valves. Compared to solid stem valves and hollow stem valves, hollow valves are advantageous due to the fact that a cavity is present in both the stem and the valve head, as the result of which improved internal cooling may be achieved. Further advantages are lower weight, avoidance of hot spots, and reduced $CO_2$. The cooling may be further improved by optimizing the interior stem geometry in order to increase the heat transport within the cavity, i.e., via a coolant that is present therein, as well as between the valve wall and the coolant. It is known here, for example, to use inserts which are inserted through the drilled disk surface into the stem; see DE 10057192 B4.

Hollow valves are typically manufactured by a combination of various processes such as forging, turning, and welding. In particular turning or milling of the cavity is costly. In addition, weld spots on the disk surface or at other operationally critical locations should be avoided. Another disadvantage of known methods is that a large number of process steps are often necessary. For example, U.S. Pat. No. 6,006,713 A relates to a hollow valve that is manufactured by closing a hollow blank by welding.

Further examples of internally cooled valves are known from the patent documents JP 2014084725 A, JP 2011179390 A, JP 2009138594 A, JP H03 52309 U, JP S63 171605 U, CN 202900355 U, CN 205154285 U, JP 2014166644 A, and EP 2690262 A1. These documents disclose various methods for manufacturing internally cooled valves by forming. Some of these documents also disclose structures in the interior of a valve cavity that are intended to improve heat transfer between a coolant and the valve body.

SUMMARY

An object of the present invention, therefore, is to provide a hollow valve having optimized interior stem geometry, and a method for manufacturing same which does not have the stated disadvantages, and has high productivity and good material utilization.

According to the invention, the object is achieved by a hollow valve having optimized interior stem geometry, including a valve body with a valve head and a valve stem, the valve stem being provided with a valve stem cavity that extends along a longitudinal axis of the valve stem, and an inner surface of the valve stem being provided with surface-enlarging structuring.

According to one aspect of the present invention, the structuring may include ribs situated on the inner surface.

According to another aspect, the ribs may extend at an angle relative to the longitudinal axis.

According to another aspect, the height of the ribs may vary in an axial direction.

According to another aspect, the structuring may include depressions in the inner surface that are separate from one another.

According to another aspect, the structuring may include adjacently situated honeycombs.

According to another aspect, the inner surface may include multiple areas having different structurings.

The object is further achieved by a method for manufacturing a valve body of a hollow valve having optimized interior stem geometry, comprising the steps of providing a bowl-shaped semi-finished product, the semi-finished product having an annular wall that surrounds a cylindrical cavity of the semi-finished product, and a base section; forming a valve head from the base section; lengthening the annular wall in an axial direction by forming, wherein a mandrel is inserted into the cavity during the forming, wherein an outer surface of the mandrel has structuring; reducing an outer diameter of the annular wall by rotary swaging without a mandrel to obtain a valve stem of the finished valve body having a predetermined outer diameter.

According to another aspect of the present invention, the method for provision of the bowl-shaped semi-finished product may include providing an at least partially cylindrical blank, and forming the bowl-shaped semi-finished product from the blank.

According to another aspect of the method, the forming of the bowl-shaped semi-finished product may take place via a hot forming process, in particular via backward can extrusion or forging.

According to another aspect of the method, the forming of the valve head may take place via a hot forming process, in particular via backward can extrusion or forging.

According to another aspect of the method, the lengthening of the annular side wall may take place via rotary swaging with a mandrel, or ironing via a mandrel.

According to another aspect of the method, the structuring of the mandrel may include grooves in the outer surface of the mandrel, elevations on the outer surface of the mandrel that are separate from one another, or honeycombed structuring made up of elevations and depressions on the outer surface of the mandrel.

According to another aspect of the method, multiple mandrels having different diameters and having successively decreasing diameters may be used during the lengthening of the annular wall, wherein at least the last used mandrel has an outer surface with structuring.

According to another aspect, the method may also comprise filling a coolant, in particular sodium, into the cavity and closing the valve stem.

The object is further achieved by a hollow valve, having optimized interior stem geometry, that includes a valve body that is manufactured using the above method.

BRIEF DESCRIPTION OF THE DRAWINGS

Exemplary embodiments of the invention are described in greater detail below with reference to the figures, which show the following:

FIGS. 1I and 1J show mandrels having an outer surface with structuring.

DETAILED DESCRIPTION

Figures 1A, 1B, 1C, 1D, 1E, 1F:
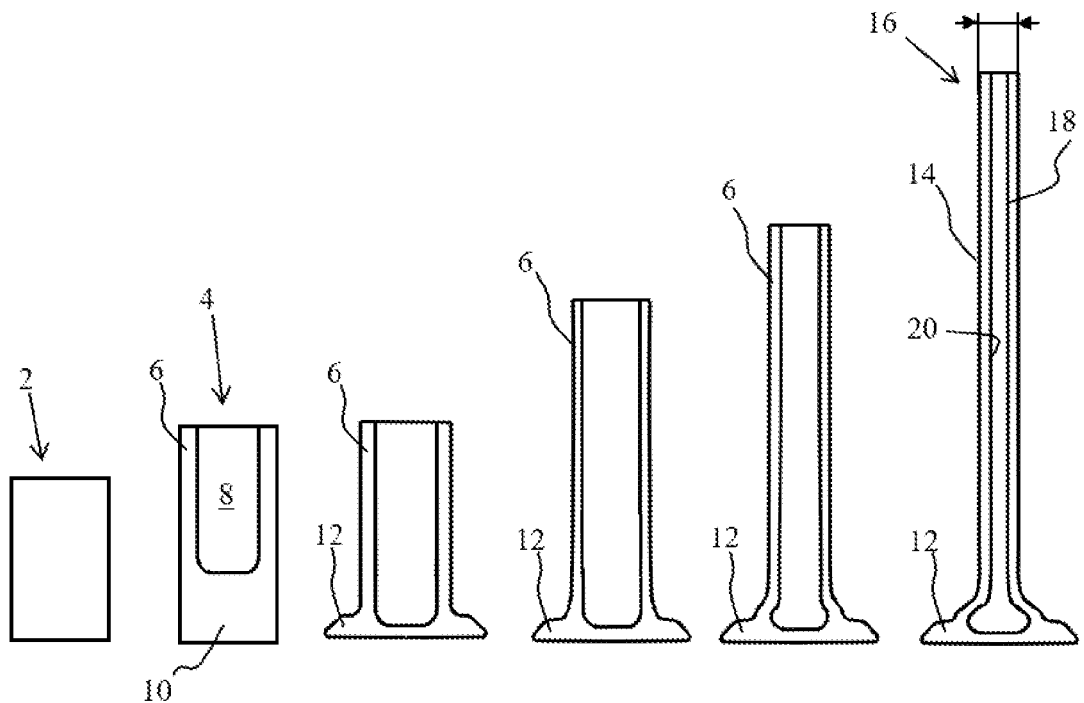
FIGS. 1A-1F show various intermediate steps of the manufacture according to the invention of a valve body of a hollow valve (illustrated in FIG. 1F) from a blank (illustrated in FIG. 1A)
Figures 1G, 1H, 1I, 1J:
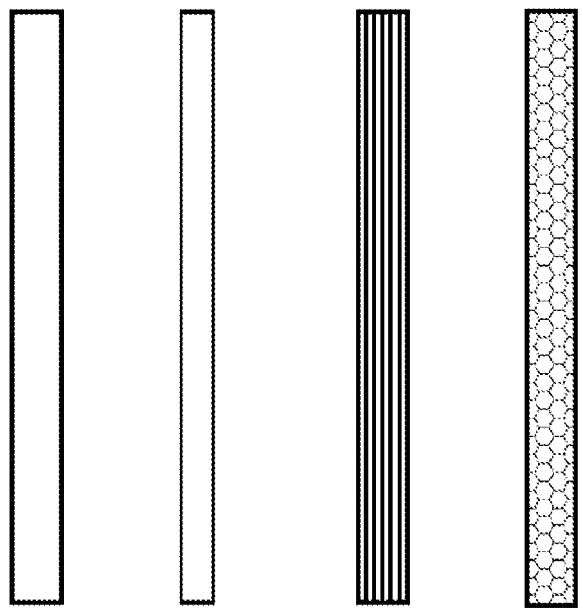
FIGS. 1G-1J show multiple mandrels having different diameters.
Figure 2A:
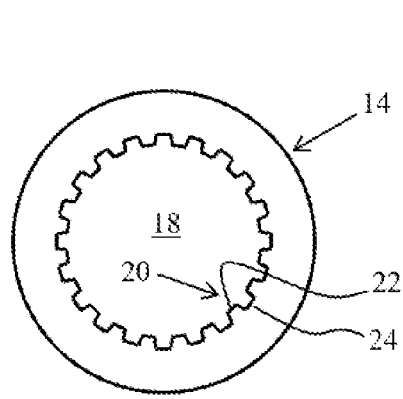
FIG. 2A shows a sectional view of a valve stem according to the invention.

FIGS. 1F and 2A respectively show an axial sectional view (i.e., a longitudinal axis of a valve stem 14 is situated in the section plane), and a radial sectional view (i.e., the section plane is orthogonal to the longitudinal axis) of a hollow valve according to the invention or its valve body 16 (the longitudinal axis of the valve defines an axial direction). The valve body 16 of the hollow valve includes a valve head 12 and a valve stem 14 having an outer diameter D, wherein a valve stem cavity 18 in the form of a cavity that extends parallel to the longitudinal axis is situated in the valve stem 14. An inner surface 20 of the valve stem 14, i.e., a boundary surface between the valve stem cavity and the valve stem wall, is provided with surface-enlarging structuring. An example of such structuring is shown in FIG. 2A, in which ribs that extend parallel to the longitudinal axis are situated on the inner surface 20. Other structuring options besides ribs are also possible, as discussed below in further examples in conjunction with FIGS. 3A-3C.

The heat transfer between the wall of the valve stem and a cooling fluid or a coolant in the valve stem cavity is increased due to the surface-enlarging structuring. The internal cooling may thus be improved and the formation of hot spots avoided, which in turn results in improved engine operation. Thus, a hollow valve having optimized interior geometry is present.

The surface-enlarging structuring includes a certain depth range of the wall of the valve stem 14, which is characterized by raised areas, referred to as elevations 22 (ribs in FIG. 2A), and lowered areas, referred to as depressions 24. "Higher" and "lower," and correspondingly "height" and "depth," refer here to the extension viewed from the wall of the valve stem. Higher areas (elevations) thus extend farther radially inwardly than lower areas (depressions). Since in general no designated "reference plane" is present, "higher" and "lower" are thus to be understood in relative terms. The transitions between elevations and depressions, unlike the steep transitions (flanks) in the radial direction in FIG. 2A, may run smoothly and/or in a curve. Starting from the transitions of the structuring in FIG. 2A, for example undulation may be obtained in the circumferential direction by smoothing the steps.

FIGS. 2B and 3A-3C show examples of structuring options for the inner surface of the valve stem in partial implementations of the inner surface 20 of the valve stem 14. The structurings of the inner surface 20 of the valve stem 14 are only schematically indicated; in particular, in some figures (FIG. 3B, FIG. 3C, FIG. 4) they do not completely cover the illustrated surface detail, which serves to simplify the drawing and is not intended to imply that the structurings cannot extend over the entire inner surface of the valve stem or any given partial areas thereof.

Figure 2B:
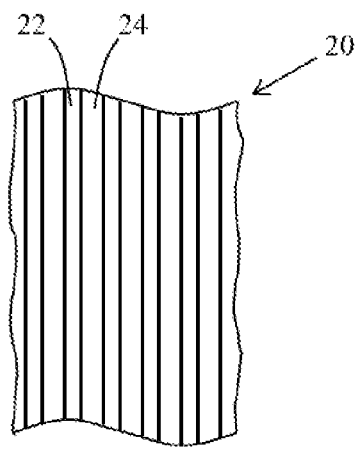
FIG. 2B shows a partial implementation of the inner surface of the valve stem of the embodiment illustrated in FIG. 2A.

According to one preferred embodiment mentioned above, ribs that extend in the axial direction are situated on the inner surface 20 of the valve stem 14. Thus, the elevations 22 are present here in the form of ribs; the depressions 24 correspond to the areas (furrows, grooves) situated between the ribs. In this regard, FIG. 2A shows a sectional view of the valve stem 14; FIG. 2B shows a partial view of an implementation of the inner surface 22 of the valve stem. To ensure clarity in the figures, in each case only one elevation 22 and one depression 24 is provided with a reference numeral; this also applies for FIGS. 3A-3C.

The number of ribs and elevations may be fixed according to the dimensions of the valve; preferably 10-50 ribs, more preferably 20-25 ribs, are situated in the circumferential direction. It is also possible for the height of various ribs and/or the height within a rib to vary (not illustrated in the figures). For example, ribs of greater and lesser height may alternate in the circumferential direction, or the height of the ribs may vary in the axial direction, for example decreasing from the valve head toward the stem end.

Figure 3A:
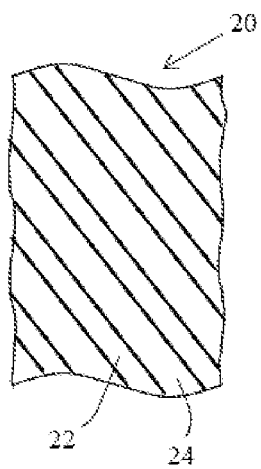
FIGS. 3A-3C show partial implementations of the inner surface of the particular valve stem of further embodiments according to the invention.
Figure 4:
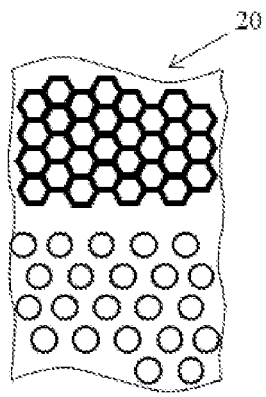
FIG. 4 shows a partial implementation of an inner surface of a valve stem having two different structurings.

The design illustrated in FIG. 3A is very similar to that in FIGS. 2A and 2B, with the difference that the elevations 22, i.e., the ribs, extend not parallel to the axial direction (longitudinal direction), but, rather, at an angle thereto. This results in the shape of an internal thread. The above discussion for FIGS. 2A and 2B concerning the number of ribs and the height or variation in height applies here as well.

Another design option for the structuring is for the inner surface of the valve stem to have essentially the shape of a (circular) cylindrical surface, from which multiple depressions, situated separately from one another, extend radially outwardly into the valve stem wall. This is illustrated by way of example in FIG. 3B, in which circular depressions 24 are present in the inner surface 20 of the valve stem. As a whole, i.e., in a 3D view, the depressions 24 may have the shape of a spherical segment. Other possible shapes of the depressions besides the circular shape are, for example, elliptical, rectangular, or quadrangular in the top view. In addition, the design in the depth direction may be different from a spherical segment, for example circular, elliptical, rectangular, or quadrangular. A depression that is circular in the top view and rectangular in the depth direction then has a shape that corresponds to a circular cylinder that is compressed into the valve stem wall in the axial direction, while a depression that is rectangular in the top view and circular in the depth direction has a shape that corresponds to a circular cylinder that is compressed into the valve stem wall in the radial direction (in the present context, "axial" and "radial" refer to the corresponding directions of the circular cylinders to be compressed). Other desired combinations of the above-mentioned shapes in the top view and in the depth direction are likewise possible.

Figure 3B:
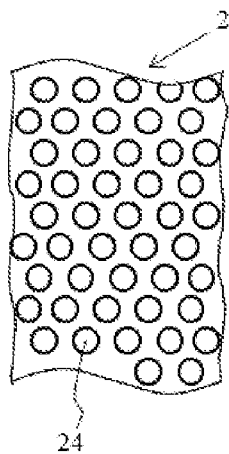
Figure 3C:
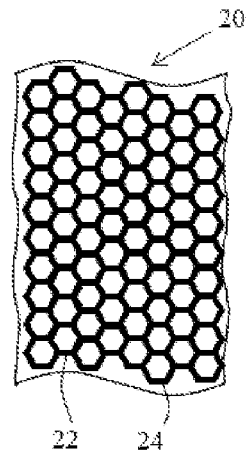

FIG. 3C illustrates by way of example a honeycombed structuring of adjacently situated honeycombs (hexagons). The elevations 22 are denoted as somewhat thicker lines. The depressions 24 are surrounded by these elevations. The transition between elevations and depressions is preferably rounded, not sharp-edged. The surface illustrated in the figure then approximately corresponds to the surface of a golf ball. In general, the "honeycombs" may also have a nonhexagonal shape, for example square or rectangular. However, full-surface structuring should be obtained by adjacently situating these honeycombs; for this purpose, differently shaped honeycombs may be used if necessary.

Also in the designs illustrated by way of example in FIGS. 3B and 3C, the number, size, and height/depth of the elevations and depressions may be configured corresponding to the dimensions of the valve and the desired valve properties (in particular heat transfer properties). In addition, a variation in the height/depth of the elevations and depressions between various areas of the inner surface of the valve stem is conceivable.

Furthermore, it is conceivable for the inner surface of the valve stem to have multiple areas that are provided with different structurings. This is illustrated by way of example in FIG. 4, in which the structurings from FIGS. 3B and 3C are situated in two different areas.

According to the invention, the manufacture of a hollow valve described above having optimized interior geometry, i.e., with structuring on the inner surface of the valve stem, takes place using the method explained below.

To this end, FIGS. 1A through 1F show axial sectional views of various intermediate steps of the manufacturing method. A blank 2 made of a valve steel known to those skilled in the art is preferably used as the starting point (see FIG. 1A). The blank has an at least partially cylindrical shape, preferably a circular cylindrical shape, corresponding to the circular shape of the valve body or valve to be manufactured.

The blank 2 is formed into a bowl-shaped semi-finished product 4 or workpiece illustrated in FIG. 1B. The semi-finished product in the form of a bowl includes a base section 10, from which a valve head (or valve disk) 12 is subsequently formed, and an annular wall 6 that surrounds a cylindrical, preferably circular cylindrical, cavity 8 of the bowl-shaped semi-finished product 4, and from which a valve stem 14 is subsequently formed. In this regard, any material may flow between the base section 10 and the annular wall 6 during the subsequent forming steps. In general, according to the invention the bowl-shaped semi-finished product 4 is directly provided; the method then starts with providing the bowl-shaped semi-finished product 4 illustrated in FIG. 1B.

The valve head 12 is formed from the base section 10 in a subsequent forming step. The workpiece thus obtained is illustrated in FIG. 1C.

The forming of the blank 2 into a bowl-shaped workpiece 4 as well as the forming of the valve head 12 from the base section 10 is preferably carried out via a hot forming process; it is also preferred to use backward can extrusion or forging. During the backward can extrusion, a stamp is pressed into the blank 2 in order to form the cavity 8.

In the next machining step, an axial length of the annular wall 6 is increased. In this context, "axial" refers to the longitudinal direction defined by the stem, i.e., the axis of the annular wall; correspondingly, "radial" is a direction orthogonal to the axial direction. To achieve an effective increase in length, during this step a mandrel (not illustrated) is inserted into the cavity, so that flow of the material in the radial direction is prevented, and the material flow takes place primarily in the axial direction. The inner diameter and the wall thickness of the annular wall 6 may thus be adjusted to a desired value. In addition, this forming step may be made up of multiple substeps, in which multiple mandrels are optionally inserted in the order of decreasing diameter. The semi-finished product shapes thus achieved are illustrated by way of example in FIGS. 1D and 1E, in which initially a mandrel having a larger diameter is used to obtain the semi-finished product state illustrated in FIG. 1D, and a mandrel having a smaller diameter is subsequently used to obtain the state illustrated in FIG. 1E. Of course, it is also possible to use more than two mandrels having different diameters.

The mandrel, or, if multiple mandrels are used, at least the last used mandrel, has structuring on its outer surface that is complementary with the desired surface-enlarging structuring of the inner surface 20 of the valve stem 14. Since the material (also) flows radially inwardly due to the rotary swaging, the structuring is transferred from the outer surface of the mandrel to the inner surface of the valve stem and is impressed on same. In particular, the outer surface of the mandrel may be complementary with the structurings described above in conjunction with FIGS. 2B and 3A-3C; i.e., the mandrel may have depressions (in the form of furrows or grooves) on the outer surface that are complementary with the ribs (FIG. 2B, FIG. 3A), may have elevations that are complementary with the depressions (more precisely, separate elevations in conjunction with FIG. 3B), or may have honeycombed structuring with elevations and depressions, which are complementary with honeycomb structuring (FIG. 3C).

Rotary swaging with a mandrel or ironing via a mandrel is preferably used as a forming process for this lengthening or elongation.

Lastly, the outer diameter of the annular wall 6 is reduced by rotary swaging to obtain a finished valve body 16 having a valve stem cavity 18, wherein the valve stem 12 has a predetermined outer diameter D, i.e., a desired target diameter (see FIG. 1F). This forming step preferably takes place without an inserted mandrel, so that the diameter may be effectively reduced, and the structuring previously impressed into the inner surface 20 of the valve stem 14 is therefore not destroyed. This step results not only in a reduction of the outer diameter, but also in further lengthening of the annular wall 6 and, without a mandrel, results in an increase in the wall thickness of the annular wall. The wall thickness would thus optionally be set to be somewhat smaller in the preceding lengthening step in order to obtain a certain wall thickness, and thus a certain inner diameter for a given outer diameter D, taking into account the increased thickness in the final step. The previously impressed structuring may also change somewhat. Thus, to obtain predetermined structuring of the inner surface of the valve stem, the outer surface structuring of the mandrel used in the preceding step is to be selected in such a way that this change in the impressed structuring is compensated for.

It is important that, after the rotary swaging for reducing the outer diameter of the annular wall 6, no further forming step of the valve body 16 takes place, since this would adversely affect the beneficial material properties obtained by the rotary swaging, and could also destroy the structuring of the inner surface of the valve stem. Rotary swaging is thus the final forming step. Rotary swaging is an incremental pressure forming process in which the workpiece to be machined is hammered in rapid succession from various sides in the radial direction. Due to the resulting pressure, the material "flows" in a manner of speaking, and the material structure is not distorted by tensile stresses. Rotary swaging is preferably carried out as a cold forming process, i.e., below the recrystallization temperature of the machined material.

Thus, a significant advantage of using rotary swaging as the final forming step is that during the rotary swaging, compressive stresses are induced by the radial transmission of force, thus preventing the occurrence of tensile stresses which increase the susceptibility to cracks; this is particularly applicable to the edge layers of the hollow stem. Such undesirable tensile stresses occur, for example, when drawing processes or "necking" (a retraction process, i.e., reducing the diameter by constriction) are used. Rotary swaging allows, among other things, uninterrupted grain flow in the workpiece. Further advantages of the rotary swaging as the final forming step, compared to drawing processes or necking, are a higher achievable surface quality and a relatively greater reduction in the diameter of the stem for each step. Due to the high level of achievable surface quality and as the result of the maintainable tolerances during rotary swaging being very small, post-machining of the valve stem is usually not necessary. With a free-form process or compression process, such as necking, generally only poorer surface quality or tolerance maintenance is achievable. Accordingly, after the rotary swaging, in particular no method step using a drawing process or necking takes place for reducing the outer diameter of the annular wall.

To complete the process for manufacturing the hollow valve, a coolant such as sodium may also be filled into the cavity of the valve body through the outwardly open end of the valve stem, and this end of the valve stem is subsequently closed, for example by a valve stem end piece, that is attached by friction welding, for example, or some other welding process (not illustrated in the figures).

The invention claimed is:

1. A method for manufacturing a valve body of a hollow valve having optimized interior stem geometry, the method comprising:
   providing a bowl-shaped semi-finished product, the semi-finished product having an annular wall that surrounds a cylindrical cavity that is open at a stem end of the semi-finished product, and a base section;
   forming a valve head from the base section;
   lengthening the annular wall in an axial direction by forming, wherein a mandrel is inserted into the cylindrical cavity during the forming; and thereafter
   reducing an outer diameter of the annular wall by rotary swaging without the mandrel present in the cylindrical cavity to obtain a valve stem having a predetermined outer diameter (D) corresponding to a finished valve body configuration to be obtained, wherein
   multiple mandrels having different, successively decreasing diameters are used during the lengthening of the annular wall, wherein at least the last used mandrel has an outer surface provided with structuring.

2. The method according to claim 1, wherein the providing of the bowl-shaped semi-finished product includes:
   providing an at least partially cylindrical blank; and
   forming the bowl-shaped semi-finished product from the at least partially cylindrical blank.

3. The method according to claim 2, wherein the forming of the bowl-shaped semi-finished product takes place via a hot forming process comprising backward can extrusion or forging.

4. The method according to claim 1, wherein the forming of the valve head takes place via a hot forming process comprising backward can extrusion or forging.

5. The method according to claim 1, wherein the lengthening of the annular wall takes place via rotary swaging with the mandrels, or ironing via the mandrels.

6. The method according to claim 1, wherein the structuring includes grooves in the outer surface, elevations on the outer surface that are separate from one another, or honeycombed structuring made up of elevations and depressions on the outer surface.

7. The method according to claim 1, further comprising:
   filling the cylindrical cavity with a coolant; and closing the valve stem at the stem end.

8. A hollow valve having optimized interior stem geometry, the hollow valve including a valve body that is manufactured using the method according to claim 1.

9. The method according to claim 7, wherein the coolant is sodium.

* * * * *